United States Patent Office 2,880,243
Patented Mar. 31, 1959

2,880,243

MANUFACTURE OF TRISUBSTITUTED BORANES

George F. Hennion, South Bend, Ind., assignor, by mesne assignments, to Olin Mathieson Chemical Corporation, a corporation of Virginia No Drawing. Application May 9, 1956
Serial No. 583,640

14 Claims. (Cl. 260—606.5)

This invention relates to improvements in the manufacture of trisubstituted boranes of the type $R_3B$ where R is a hydrocarbon radical and can be aliphatic, alicyclic or aromatic.

The borane products of the process of this invention are generally old compounds of known utility. They have previously been prepared by the Grignard reaction of reagents of the RMgX type in ether solution with boron halides. They have also been prepared as described in U.S. Patent No. 2,446,008, issued July 27, 1948, to Hurd, assignor to General Electric Company. The patented process comprises passing mixed vapors of an organic halide and a boron halide at temperatures of 250° to 400° C. over granular zinc or aluminum.

It has now been found that the substituted boranes can be made advantageously by the direct action of an organic halide with magnesium metal and a boron compound of the formula $BX_3$ in which X is a halogen or an alkoxy group. The process of this invention is carried out at much lower temperatures than used by Hurd by contacting ethereal solutions of the mixed organic halide and $BX_3$ compound with magnesium metal at temperatures of from about room temperature (20° C.) to about 60° C. or slightly higher.

The process of the present invention comprises the addition of the organic halide and boron halide, in suitable proportions, separately or previously mixed, to magnesium metal under a suitable ether. By introducing the two halides in substantially stoichiometric proportions, the formation of undesired by-products and uncontrollable reactions are avoided. The advantages of the prescribed procedure, compared with any other order of addition, include easily controlled reactions, improved yields, adaptability to intermittent or continuous operation and other advantages which appear in the following description.

A particular advantage of the process of the present invention is that it is not necessary as a preliminary step to prepare a Grignard reagent from the organic halide and magnesium in ether but that a mixture of an organic halide and a boron halide, for example, in ethereal solution, reacts with magnesium metal to form trisubstituted boranes in excellent yields. Since, according to the present process, the Grignard reagent is not prepared before introducing the boron compound, it might be expected that the organic halide would react to form a Wurtz-type hydrocarbon product and the boron halide would be reduced to elemental boron or a magnesium boride. However, the reaction proceeds substantially according to Equation 1:

$$3RX + 3Mg + BX_3 \rightarrow R_3B + 3MgX_2 \quad (1)$$

and no substantial proportion of the reagents appear to be used in forming by-products by reactions represented by Equations 2, 3 or 4:

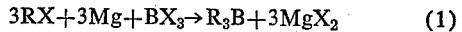  (2)
  (3)
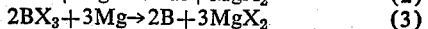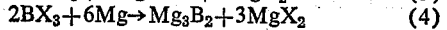  (4)

A further advantage of the present process is that the process can be carried out batchwise or continuously. In the batch method, the operation can be interrupted at any time without any deleterious effects. The reaction can be resumed promptly by resuming the addition of reagents. No hazardous organo metallic solutions or suspensions need be stored at any time. Continuous operation is smooth and easily controlled by the rate of addition of the reagents. Thus the reagents can flow continuously through a bed of magnesium and the effluent can be continuously decomposed, separated, dried and fractionated. The ether solvent can be continuously recycled and additional magnesium can be charged from time to time without interrupting the process.

It is a further advantage of the present process that it is operated at relatively low temperatures. Thermally sensitive alkyl halides can be safely used and thermally sensitive substituted boranes can be prepared. For example tertiary butyl chloride, which decomposes at slightly elevated temperatures to form isobutylene and hydrogen chloride, can be used as a reagent. Although tri-n-butylborane decomposes even at 125–130° C., it can be prepared in excellent yields by the present process without encountering any decomposition.

Suitable organic halides include the alkyl halides, aryl halides, and alicyclic halides. The lower alkyl halides are preferred, particularly those having one to five carbon atoms, for example, methyl iodide, ethyl bromide, isopropyl chloride and tertiary butyl chloride. It is one of the advantages of the present invention that heat-labile halides are useful in the process since the use of high temperatures is avoided. Thus, while tertiary butyl chloride could not be used in a process utilizing temperatures of 250° C. or higher because of decomposition to isobutylene and hydrogen chloride, the tertiary butyl chloride is entirely suitable for use in the present process. Substituted alkaryl halides, for example, benzyl chloride, chloromethyl toluenes or chloromethylnaphthalenes can also be used. Suitable alicyclic halides include cyclohexyl chloride, cyclopentyl bromide and the like. Aryl halides useful in the present process are preferably the more reactive aryl halides such as bromobenzene and alpha bromonaphthalene and their equivalents.

Boron trichloride is the preferred boron halide since it is readily available, reactive and cheaper than other boron halides but boron tribromide, boron trifluoride and their etherates can be used. Borate esters of the formula $B(OR)_3$ are included in the formula $BX_3$ as defined above and are a subclass of suitable reactants, particularly where the R is a lower alkyl group of about one to five carbon atoms, for example, trimethyl borate, triethyl borate, tri-n-butyl borate among other borate esters.

The magnesium is not ordinarily used in a massive form but turnings or granular magnesium are preferable.

The proportion of reactants used is not extremely critical. The stoichiometric ratio of three gram moles of organic halide and three gram atoms of magnesium per gram mole of boron halide can be used but some excess (e.g., 10 percent) of organic halide and magnesium are preferred since better yields of the desired trisubstituted boranes are thus obtained. The proportions of magnesium should be sufficient to combine with all the halogen or other negative radicals present in the reagents.

The reaction of the present invention is carried out in a dry ethereal medium. The lower dialkyl ethers containing not more than five carbon atoms in each alkyl radical are ordinarily preferred but cyclic, non-reactive ethers can also be used. Examples includes diethyl ether, di-n-butyl ether and tetrahydrofuran. The higher boiling ethers permit the use of slightly elevated reaction temperatures, e.g. 60° C. or higher. The ethers are suitably dried and/or otherwise purified as, for example, for use in the Grignard reaction. The ether reaction medium is used in convenient proportions but the amount is not critical. To avoid unnecessary handling and recovery, the concentration of reactants and products can be, for example, about 40 weight percent but more or less concentrated solutions (e.g., 10 percent to 60 percent) can also be used.

Procedurally, it is convenient to dissolve the two halide reactants in separate or the same ether solution in suitable proportions and introduce them into a reaction vessel containing the magnesium which is covered with ether. Vigorous stirring of the reaction mixture is important in speeding the rate of reaction. The heat of the reaction may be sufficient to cause the ether to reflux but additional heat may be supplied to speed the reaction. In a continuous system, provision may be made for intermittent replenishing of the magnesium, continuous introduction of halide reactants and continuous removal of the reaction mixture. Sufficient contact time should be provided to complete the reaction while the solution is in contact with the magnesium. The effluent stream is suitable fractionated to recover the trisubstituted borane, recycling the solvent and unreacted halides to the reaction zone.

Yields are usually above about 60 percent but may vary from about 40 to 80 percent or more. Some organic halides generally give better yields than others as illustrated in the following examples.

*Example I*

A 2-liter reaction vessel fitted with a reflux condenser, stirrer and dropping funnel was charged with 36.5 g. (1.5 gram atoms) of magnesium turnings. The system was then flash-flamed with nitrogen passing through in order to remove moisture and oxygen. The magnesium was covered with 200 ml. of anhydrous ether and a small crystal of iodine was added. Several milliliters of n-butyl bromide was added to activate the magnesium and the remainder of 205.5 g. (1.5 gram mole) of n-butyl bromide, diluted with 250 ml. of anhydrous ether mixed with 37.8 g. (0.5 gram mole+10 percent excess) of boron trifluoride previously dissolved in 250 ml. of anhydrous ether was added at a rate sufficient to maintain a gentle reflux. The addition required 5 hours. During this time the mixture was stirred vigorously. After the addition was complete the material was stirred for one additional hour until refluxing ceased. The reaction mixture was then hydrolyzed with 450 ml. of distilled water containing a small amount of hydrochloric acid. The acidified water was added slowly in order to absorb the heat of reaction by refluxing without mechanical loss. After the hydrolysis was complete, the upper ether layer was separated under nitrogen and the aqueous layer was extracted twice with 200 ml. portions of ether. The combined ether solutions were dried over calcium chloride overnight and the ether distilled off. The residue was distilled through a 60 cm. glass helix packed column. After removing a small amount of unreacted butyl bromide, 112 g. (0.62 gram mole) of the tri-n-butyl borane, boiling at 205–212.5° C., was recovered in a yield based on the n-butyl bromide of 62 percent.

*Example II*

Tri-n-butylborane was prepared using the same apparatus and procedure as in Example I using 411 g. (3 gram moles) of n-butyl bromide, 72.9 g. (3 gram atoms) of magnesium turnings, and 117.2 (1 gram mole) of boron trichloride. The complete addition of the reagents required 6 hours and stirring was continued for an additional 2 hours. Worked up in the same way as previously described, the yield of tri-n-butylborane was 60 percent.

*Example III*

The procedure of Example I was repeated using 277.7 g. (3 gram moles) of n-butyl chloride, 143.7 g. of boron trifluoride etherate (containing 1.015 gram moles of boron trifluoride) and 72.9 g. (3 gram atoms) of magnesium. Worked up as before, the 118.6 g. of tri-n-butylborane boiling at 205–212° C., amounted to a yield of 65.2 percent.

*Example IV* n-Butyl chloride and boron trichloride in a 3:1 molar ratio were reacted according to the procedure of Example I with 74.4 g. (3 gram atoms+2 percent) of magnesium. Extracted, dried and distilled as before, 89.6 g. of tri-n-butylborane was recovered boiling at 200–214° C. The lower boiling fractions were combined and refractionated to obtain an additional 23.7 g. The total weight of tri-n-butylborane was 113.3 g. amounting to 62.4 percent of the theoretical yield.

*Example V*

A reaction vessl fitted with reflux condenser, stirrer and dropping funnel was charged with 74.4 g. (3 gram atoms+2 percent) of magnesium and flash-flamed with a stream of nitrogen passing through in order to remove moisture and oxygen. A mixture of 369 g. (3 gram moles) of n-propyl-bromide, 141 g. of boron trifluoride etherate (containing 1 gram mole of boron trifluoride) and about 2 liters of ether was added at a rate serving to maintain the reaction mixture at reflux temperature. During the addition the reaction mixture was vigorously stirred. After the addition was complete the reaction mixture was stirred overnight. It was refluxed for another 2 hours, allowed to cool to room temperature and separate. The clear upper layer of ether solution was removed under nitrogen and washed with distilled water. The lower layer was hydrolyzed by the careful addition of water and extracted twice with two 200 ml. portions of ether. The combined extracts were dried over calcium chloride and the ether distilled. The residue was fractionated through a 50 cm. glass helix packed column under a nitrogen atmosphere. Eightly-four grams of tri-n-propyl borane, boiling at 156° C. at atmospheric pressure, was recovered in a yield of 60 percent.

*Example VI*

A three-liter, three-necked round bottom flask was fitted with reflux condenser, stirrer, dropping funnel and nitrogen inlet. Magnesium turnings (95 g.; 3.86 gram atoms) were placed in the flask which was then flash-flamed under nitrogen. After cooling, 300 ml. of ether was introduced. A solution of 300 g. (3.82 moles) of iso-propyl chloride, 124 g. (1.16 moles) of boron trichloride and 600 ml. of anhydrous ether was prepared and 30 ml. of the solution was introduced to the magnesium turnings to start the reaction. When refluxing began, it was maintained by the addition of the remainder of the solution. About 8 hours were required and refluxing was continued for 2 additional hours. The reaction mixture was cooled under nitrogen in an ice bath and decomposed by the careful addition of 700 ml. of 5 percent aqueous hydrochloric acid. The ether layer was removed and the aqueous layer was extracted three times with 400 ml. portions of ether. The combined ether extracts were dried over anhydrous magnesium sulfate and distilled. After removing the ether, the residue was fractionated to obtain 102 g. of tri-isopropylborane, boiling at 148–154° C., in a yield of 63 percent.

*Example VII*

A three-liter, three-necked round bottom flask was fitted with a condenser, stirrer, dropping funnel and nitrogen inlet. Magnesium turnings (100 g.; 4.08 moles) were placed in the flask which was then flash-flamed under nitrogen. After cooling, 300 ml. of anhydrous ether was added. A solution of 372 g. of (4.02 moles) of tertiary butyl chloride and 117 g. (1 mole) of boron trichloride in 600 ml. of ether was prepared and 20 ml. was introduced to the magnesium to start the reaction. The remainder of the solution was added at a rate which maintained refluxing. About 1000 ml. of additional ether was added during the course of the reaction to maintain fluidity. The tert.-butyl chloride and magnesium were used in 30 percent excess. About 8 hours were required to complete the addition and the mixture was refluxed for an additional two hours. The reaction mixture was cooled under nitrogen in an ice bath and hydrolyzed by the addition of 700 ml. of 5 percent aqueous hydrochloric acid. The ether layer was removed and the aqueous layer was extracted three times with 400 ml. portions of ether. The combined extracts were dried over anhydrous magnesium sulfate and distilled. After removing the ether, the residue was fractionated to obtain 133 g. of tritertiarybutyl borane boiling at 185–190° C., in a yield of 73 percent.

*Example VIII*

A one-liter, three-necked round bottom flask was fitted with a condenser, stirrer, dropping funnel and nitrogen inlet. Magnesium turnings (24.3 g.; 1.0 mole) were placed in the flask which was then filled with nitrogen. Two ml. of cyclohexylchloride and 150 ml. of anhydrous ether was added. A solution of 130.5 g. (1.10 moles) of cyclohexylchloride and 39.1 g. (0.33 mole) of boron trichloride in 265 ml. of ethereal solution was added at a rate which maintained refluxing. About four hours were required to complete the addition and the mixture was refluxed for an additional hour. The reaction mixture was cooled under nitrogen in an ice bath and hydrolyzed by the addition of 450 ml. of aqueous solution containing 150 ml. of concentrated hydrochloric acid. The ether layer was removed and the aqueous layer was extracted twice with 100 ml. portions of ether. The combined extracts were washed with water, 5 percent aqueous sodium bicarbonate and water, and dried over anhydrous calcium chloride and distilled. After removing the ether, the residue was vacuum fractionated to obtain 40.8 g. of tricyclohexylborane boiling at 189–207° C. at 15 mm. pressure in a yield of 48 percent. This product crystallized on standing and then melted at 97.5–99.0° C.

*Example IX*

Tri-alpha-naphthylborane was prepared using the procedure of Example VIII employing 227.7 g. (1.1 gram moles) of alpha-bromonaphthalene, 39.1 g. (0.33 gram mole) of boron trichloride and 265 ml. of ether added to 24.3 g. (1.0 gram atom) of magnesium covered with 150 ml. of ether. After hydrolysis and extraction, a white crystalline solid appeared in the ether layer. It was removed by filtration, washed with anhydrous ether and dried in a desiccator over calcium chloride in a nitrogen atmosphere. The dry solid, amounting to 31.5 g. was tri-alpha-naphthylborane melting at 204–204.5° C. and amounting to a 27 percent yield based on the boron trichloride. The aqueous phase was extracted twice with 100 ml. portions of ether and the ethereal solutions were combined, washed with water, 5 percent sodium bicarbonate solution, water and dried over calcium chloride. The ether was removed by distillation and the residue was vacuum distilled at 6 mm. pressure to a vapor temperature of 210° C. The residue of 55.8 g. was crystallized from 50 ml. of carbon tetrachloride and filtered under nitrogen. The solid, washed with cold carbon tetrachloride and dried in a desiccator over calcium chloride in a nitrogen atmosphere, amounted to 28.2 g. of tri-alpha-naphthylborane, M.P. 194–197.5. Total yield was 59.7 g. or 51 percent of the theoretical.

*Example X*

A five-liter, three-necked, round bottom flask was fitted with a condenser, stirrer, dropping funnel and nitrogen inlet. It was charged with 170.1 g. (7.0 gram atoms) of magnesium turnings and flash-flamed under nitrogen. After cooling, the magnesium was covered with 500 ml. of anhydrous ether. A solution of the other reactants was prepared by dissolving 234 g. (2.0 moles) of boron trichloride gas in 500 ml. of ether while cooling in an ice bath. An additional 1000 ml. of ether and 647.5 g. (7.0 moles) of n-butyl chloride were combined with the boron trichloride solution. About 30 ml. of the resulting solution was added to the magnesium and the reaction started. The balance of the reagent solution was added over a period of about 10 hours at a rate which maintained a gentle reflux of the ether. After an additional 2 hours refluxing, the mixture, still under nitrogen, was cooled in an ice bath and hydrolyzed by the careful addition of 1000 ml. of 3 N hydrochloric acid. The ether layer was removed and the aqueous layer extracted three times with 400 ml. of ether. The extracts were combined, dried over magnesium sulfate and distilled. After removing the ether, the residue was fractionated to obtain 302 g. (83 percent yield) of tri-n-butylborane boiling at 205–214° C.

*Example XI*

The apparatus of Example X was charged with 36.4 g. (1.5 gram atoms) of magnesium turnings and a solution of 235.5 g. (1.5 moles) of bromobenzene and 58.6 g. (0.5 mole) of boron trichloride in 500 ml. of anhydrous ether was added to maintain reflux. After the addition was complete, the mixture was stirred for an additional three hours and then hydrolyzed with water. The ether layer was removed and the aqueous layer extracted with two 200 ml. portions of ether. The combined extracts were dried over calcium chloride and distilled. The solid remaining after the ether was removed was vacuum distilled to obtain 63 g. or 52 percent of triphenylborane. M.P. 136° C.

*Example XII*

A solution of 139.8 g. (1.5 moles plus 3 percent excess) of methallyl chloride and 58.5 g. (0.5 mole) of boron trichloride in 250 ml. of anhydrous ether was added to 37.6 g. (1.5 gram atoms plus 3 percent excess) of magnesium turnings in the apparatus of Example X. After the addition was complete, stirring was continued for one hour. The mixture was hydrolyzed with distilled water, the ether layer was removed and the aqueous layer extracted twice with 200 ml. portions of ether. The combined extracts were dried over calcium chloride and distilled. After removing the ether, a fraction of bi-methallyl was obtained and finally the trimethallylborane which boiled at 205–207° C.

The compounds produced by practicing the process of this invention can be used for a wide variety of purposes. For example, if desired, burned with air or gaseous oxygen, they can be employed in the welding method described in U.S. Patent No. 2,582,268 to Nerad.

As described by Huges et al., Ind. Eng. Chem. 43, 284–4 (1951), the incorporation of tributylborane or other trisubstituted boranes in motor fuels reduce the increase in octane requirement of internal combustion engines using such fuels. According to U.S. Patent 2,267,701 to Leum, the cetane number of diesel fuels is raised by the addition of trisubstituted boranes thereto. The oxidation stability of motor fuels is improved by the incorporation of trisubstitued boranes in the form of their addition compounds with organic amines according to U.S. Patent 2,257,194 issued to Rosen. In addition, the trisubstituted boranes are useful synthetically. For example, Hurd, J. Org. Chem. 13, 711–3 (1948), describes the preparation of lithium tetramethyl borate, $LiB(CH_3)_4$ from lithium methyl and trimethylborane in ether. Meerwein et al., J. prakt. Chem. 147, 226–55 (1936), describe several synthetic reactions of trialkyl boranes with aldehydes and organic acids.

I claim:

1. A method for the manufacture of boranes of the formula $R_3B$ which comprises introducing an ether solution of both a compound of the formula $BX_3$ and a compound of the formula RY into a mixture of magnesium metal and an ether maintained at a temperature of about 20° C. to 60° C., R being a hydrocarbon radical selected from the group consisting of lower alkyl radicals, lower alkenyl radicals, alicyclic radicals having from 5 to 6 carbon atoms, and aromatic radicals having from 6 to 11 carbon atoms, X being a halogen atom and Y being a halogen atom selected from the group consisting of chlorine, bromine and iodine.

2. The method of claim 1 wherein $BX_3$ is boron trifluoride.

3. The method of claim 1 wherein $BX_3$ is boron trichloride.

4. The method of claim 1 wherein RY is a lower alkyl chloride.

5. The method of claim 1 wherein RY is normal butyl chloride.

6. The method of claim 1 wherein RY is isopropyl chloride.

7. The method of claim 1 wherein $BX_3$ is boron trifluoride and wherein RY is normal butyl chloride.

8. The method of claim 1 wherein $BX_3$ is boron trichloride and wherein RY is normal butyl chloride.

9. The method of claim 1 wherein $BX_3$ is boron trifluoride and wherein RY is isopropyl chloride.

10. The method of claim 1 wherein RY is a monohalobenzene.

11. The method of claim 1 wherein RY is monobromobenzene.

12. The method of claim 1 wherein $BX_3$ is boron trichloride and wherein RY is monobromobenzene.

13. The method of claim 1 wherein RY is methallyl chloride.

14. The method of claim 1 wherein $BX_3$ is boron trichloride and wherein RY is methallyl chloride.

References Cited in the file of this patent

Krause and Grosse: "Die Chemie der Metall-Organischen Verbindungen," Edwards Brothers, Inc., Ann Arbor, Mich. (1943), pp. 194–195.

Brown: Journal Amer. Chem. Soc., vol. 67, pp. 374–8 (1945).

Wertheim: "A Textbook of Organic Chemistry," 3rd ed., McGraw-Hill Book Co., Inc., N.Y. (1951), pp. 639–640.

Kharasch et al.: Grignard Reactions of Non-metallic Substances, Prentice-Hall, Inc., N.Y. (1954), p. 38.